Patented Apr. 27, 1954

2,676,889

UNITED STATES PATENT OFFICE 2,676,889

PROCESS FOR PREPARING A FOOD PRODUCT

Burton Keenan, Kendallville, Ind., assignor to G. R. K. Chemical Co. Inc., Huntertown, Ind., a corporation of Indiana No Drawing. Application July 3, 1953,
Serial No. 366,060

3 Claims. (Cl. 99—100)

1

This invention relates generally to the treatment of vegetables, and more particularly is directed to a process or method of preparing a food product such as chips from potatoes.

This application is a continuation-in-part of my application, Serial Number 218,139, filed March 29, 1951, now abandoned.

It is recognized that the manufacturers of potato chips are continually confronted with the problem of obtaining potatoes which have been properly conditioned or cured for use and with maintaining control of the color, flavor, crispness and texture of the product.

Failure to secure potatoes satisfactory for good chips is itself a major problem in the industry when it is realized that one common or conventional method now currently employed to condition the potatoes requires that they be stored at a temperature of about seventy degrees for a period of from three to five weeks in order to modify their chemical structure so that chips made from such potatoes will not fry unduly dark or brown. This particular method of conditioning or curing has fluctuated to such an extent that the period or time of storage has, in some instances, progressively increased to approximately fifteen weeks. Subjecting enormous quantities of potatoes to such a high temperature, or even a relatively lower temperature, for this extended period naturally causes a high percentage of spoilage and loss resulting from shrinkage. In some instances decay runs as high as thirty per cent. The cost of handling such potatoes conditioned in accordance with this conventional method of storage and cost of removing decayed portions of such potatoes prior to slicing is excessive and then only between seventy or seventy-five per cent thereof will fry satisfactorily.

It is believed by many authorities on the subject that different fungicides, insecticides and commercial fertilizers used in connection with the raising of potatoes changes their chemical structure to such an extent that chips made therefrom are unsatisfactory to the manufacturer because they fry dark brown.

Also, the chemical constituents of different kinds of potatoes vary considerably and ofttimes a variance will occur between the same kind of potatoes grown in different fields where the soil conditions do not correspond.

It is further recognized that other attempts have been made to prevent undue browning of potato chips. For example, another method requires that the potatoes be immersed in a certain type of conditioning solution for a period of twenty-two hours for the purpose of modifying the chemical structure of the potatoes. Obviously, any method which necessitates immersing potatoes for this or an appreciable greater or lesser period of time could never be satisfactorily utilized on a large scale production basis because of the vast storage tank capacity required.

It is further known that many different kinds of chemical solutions have been heretofore employed for treating whole or sliced potatoes in advance of frying. The majority of such solutions, however, have not proven successful for the reason that they leave a bad aftertaste while other solutions cause the chips to have a rancid flavor shortly after manufacture. Moreover, some of these solutions are expensive and difficult to utilize due to variables in timing and heating of the solutions.

When all of the foregoing and other related matters are taken into consideration, it will be evident that there is a profound need for a better novel method or process to simplify and correct the confused conditions now existing in the industry.

Accordingly, one of the principal objects of the subject invention is to provide a unique process or method, embodying a solution, whereby all of the disadvantages above referred to are substantially eliminated. More particularly, the process will permit the industry to use substantially all kinds of potatoes regardless of whether they are first conditioned by storage. In other words, the process has proven equally successful in treating new potatoes as well as old potatoes which have been stored at various temperatures and different periods of storage. For example, if one lot of potatoes is stored at a temperature of thirty-five degrees for a period of five weeks and another lot at a temperature of fifty degrees for eight weeks, both lots would react or respond substantially alike to the same treatment. Thus, potatoes from different lots or batches can be mixed together as their identity is lost, but the chips made from this mixture will be the same.

A significant object of the invention is to provide a new process whereby uniformity of color, flavor and texture of the potato chip can be readily controlled and maintained. Chips manufactured in accordance with the invention retain their original flavor and crispness for a long period of time and do not become rancid. This is, of course, an important advantage to the manufacturer, retailer and consumer.

Another object of the invention is to provide a process which can be readily used in conjunction with any of the conventional potato chip making machines or apparatus now being used by the industry.

A further object of the invention is to provide a process which is reliable, efficient and inexpensive.

Many other objects and advantages of the invention will become apparent after the description hereinafter set forth is considered.

Before describing in detail the solution embodied in the process or method constituting the subject invention it is believed desirable to refer briefly to the character of the conventional machines now being currently employed in manufacturing potato chips and sticks. The majority of such machines are operated on the conveyor principle and include, among other things, a unit for removing the peel, a unit for washing the whole potato or sections thereof, a slicer, a series of three separate but connected tanks through which clean water continuously circulates for washing the slices and removing excess starch and foreign matter, a spray, an inclined conveyor for draining off excess water and feeding the slices into a vat of accepted fat or vegetable shortening for frying, an inclined conveyor for draining off excess shortening or oil, a horizontal conveyor where the chips are inspected, a salter, and another conveyor from which the chips are removed for packaging. Attention is directed to the fact that considerable starchy foam generally collects and builds up in the third washing tank so it is customary to spray the slices as mentioned before they enter upon the inclined conveyor leading to the vat. The operation of such a machine is continuous so that whole or sections of raw potatoes introduced at one end of the machine are successively acted upon to produce potato chips at its other end.

The subject invention, among other things, is directed to a solution which is preferably introduced into the second of the three washing tanks for subjecting the potato slices to the solution directly after they leave the slicer. It is to be distinctly understood that insofar as the present invention is concerned the solution can be placed in any one of three tanks or in another tank constituting an additional component.

As now practiced, the solution is placed in the second tank so that the slices will be washed immediately prior to and after treatment by the solution. If the solution were placed in the third tank then it would, of course, be desirable to wash or rinse the slices prior to frying.

The constituents and amounts used in the solution are as follows:

| | Per cent |
|---|---|
| H₂O or water | 98.75 |
| NaCl or salt | 1.225 |
| Na₃C₆H₅O₇.5H₂O or sodium citrate | .025 |

The constituents and amounts used in another solution which as proven satisfactory are as follows:

| | Per cent |
|---|---|
| H₂O or water | 98.525 |
| NaCl or salt | 1.225 |
| Na₃C₆H₅O₇.5H₂O or sodium citrate | .25 |

The water, salt and sodium citrate are preferably first mixed together and then a small amount of citric acid $C_6H_8O_7$ is added to establish a controlled pH of from 2.99 to 6.99. It has been determined that a pH from 4.5 to 5.5 has proven most satisfactory. Ascorbic acid in a minute amount is also preferably added to the citric acid if a more intense retarding action of browning is found necessary. It is to be understood that the percentage of the constituents may be slightly varied to accomplish the results desired, particularly in view of the fact that the hardness of the water varies in different localities.

Provision is made for preferably maintaining the solution in the second tank at a temperature anywhere between 195 degrees and 205 degrees Fahrenheit, although a range between 150 degrees and 212 degrees may be suitable under certain conditions. The sliced potatoes are immersed in and preferably subjected to this hot solution for a period of about one minute. The immersing period may vary within a range of ten seconds to ten minutes but the one minute period has proven most satisfactory under all operating conditions. After the slices are thus treated, they are passed through a tank of clean cold water for a period of ten seconds or more. The temperature of the water in this tank may be anywhere above freezing or below boiling. The potato slices are then conveyed to a vat for frying.

When the potato slices are subjected to the solution, the carbohydrates and proteins are attacked or inactivated by hydrolysis and/or catalytic action. The proteins break down and/or separate into various amino acids during the hydrolitic action to change the chemical structure of the chips. The chemical agents in the process break down and/or separate the proteins into amino acids which are amphoteric in nature, thus retarding the color change in the product. The above reactions plus the breakdown of the carbohydrates in the potato by the use of a weak edible acid, such as citric or combinations of other edible acids, affords a complete control over the pH factor. The pH control of the solution is one of the governing factors of the resultant color, and the lower the pH the more intense is the retarding of the color. A pH of 6.0 down to 3.0 is practical but a pH of 5.5 down to 4.5 has proven most satisfactory. A pH of below 3.0 imparts an acid flavor which is not entirely eliminated in the subsequent washings, as used in present production methods of potato products and other farinaceous tuber products.

In addition to the foregoing it is to be understood that various forms of citrate other than sodium citrate can be utilized.

Accordingly, it should be manifest that the present invention will produce chips of an appetizing character and eye appeal to customers. More particularly, the chips have a uniform relatively white or light color and the original flavor, freshness and cripsness is retained for an exceptionally long period of time in contrast to chips manufactured prior to the advent of this invention. The process also provides chips of uniform texture and brittleness is, in some measure, eliminated.

I claim:

1. A process of treating sliced potatoes, which comprises washing the slices in a solution containing approximately 98.75% water, 1.225% of salt, .025% of sodium citrate and a small amount of citric acid to obtain a pH value from 3.00 to 6.00 for a period of anywhere between ten seconds and ten minutes at a temperature ranging between 150 degrees Fahrenheit to boiling.

2. A process of treating sliced potatoes, which comprises washing the slices in a solution containing approximately 98.75% water, 1.225% of salt, .025% of sodium citrate and a small amount of citric acid to obtain a pH value from 3.00 to 6.00 for a period of anywhere between ten seconds and ten minutes at a temperature ranging between 150 degrees Fahrenheit to boiling, and then rinsing the slices to remove any excess solution therefrom.

3. A process of treating sliced potatoes, which comprises washing the slices in a solution containing approximately 98.525% water, 1.225% of salt, .25% of sodium citrate and a small amount of citric acid to obtain a pH value from 3.00 to 6.00 for a period of anywhere between ten seconds and ten minutes at a temperature ranging between 150 degrees Fahrenheit to boiling.

References Cited in the file of this patent

UNITED STATES PATENTS

| Number | Name | Date |
| --- | --- | --- |
| 2,098,209 | Grande | Nov. 2, 1937 |
| 2,117,478 | Hall | May 17, 1938 |
| 2,176,347 | Jansen | Oct. 17, 1939 |
| 2,475,838 | Johnson et al. | July 12, 1949 |
| 2,511,804 | Hall et al. | June 13, 1950 |
| 2,583,686 | Ment et al. | Jan. 29, 1952 |
| 2,620,277 | Scalera | Dec. 2, 1952 |